Patented Oct. 25, 1949

2,485,859

UNITED STATES PATENT OFFICE 2,485,859

PREPARATION OF HISTIDINE AND LEUCINE

Luigi Butturini, Milan, and Giuseppe Bernini, Melegnano, Italy, assignors to Carlo Erba S. A., Milan, Italy, a firm No Drawing. Application November 8, 1948, Serial No. 59,017

3 Claims. (Cl. 260—309)

There has already been proposed (Vickery, J. Biol. Chem. 143, 77, 1942) a method of preparation of histidine by means of the precipitation of this in the form of a salt of the 3,4-dichlorobenzene-sulphonic acid directly from the hydrolyzed protein acid, which salt has been demonstrated to be relatively insoluble (Docherty, Stein and Bergmann, J. Biol. Chem. 135, 487, 1940).

This method presents a difficulty consisting in the tendency of the monosulphonate of leucine to crystallise together with the disulphonate of histidine. This difficulty has revealed itself to be so serious that it was proposed to abandon the direct precipitation by hydrolysis (Vickery, J. Biol. Chem. 144, 719, 1942) and to proceed in the first place with the separation of the histidine with the use of silver salts in a neutral medium.

An object of the present invention is to obtain histidine salts and leucine salts with easy and complete separation from each other.

Another object of the invention is to obtain both the leucine and the histidine in a state of great purity.

The process, according to the invention is based on the discovery that the said salts of leucine and histidine have different solubilities in organic solvents; for example, the salt of the chlorobenzenesulphonic acid of leucine is very easily soluble in acetone, while the corresponding histidine salt is practically insoluble in that solvent.

The following is an example of the method of proceeding according to the invention.

5 kgs. of whole blood is heated with 2.2 litres of concentrated HCl. During the hydrolysis a part of the liquid is made to evaporate until it renders the final volume of the hydrolysed solution approximately equal to 3 litres.

After decoloring with carbon and cooling, the solution is evaporated to dryness and the volume is brought up to 4.3 litres and filtered. To the filtrate there are added 500 grs. of 3,4-dichlorobenzene-1-sulphonic acid and salts of leucine and histidine. This is left for three days in the refrigerator, then it is filtered and the precipitate is washed with a little cold water containing 4% of 3,4-dichlorobenzenesulphonic acid. The precipitate is dried and when the mixture is perfectly dry it is ground and extracted with 500 ccs. of acetone.

The leucine salt passes into solution, while the histidine salt remains undissolved. The precipitate of histidine, about 192 grs., is crystallised by the use of 1100 cc. of a 4% solution of 3,4-dichlorobenzene-1-sulphonic acid (172 grs.) and decomposed in the way already described by Vickery (in the journal first referred to herein).

The leucine salt is recovered by distilling off the acetone.

The leucine salt dried and weighed about 110 grs. is again brought into solution with 500 ccs. of boiling water and mixed with a solution of 56 grs. of barium chloride in 200 ccs. of boiling water. The barium salt of the sulphonic acid is allowed to crystallise, the precipitate is filtered and washed and the waters containing the chlorohydrate of leucine, after the excess of barium has been removed by means of sulphuric acid, are concentrated until dry. 100 ccs. of water is taken and is heated to 80–90° C. and then there is added with energetic shaking concentrated ammonia up to pH 7.5–8.

After the precipitate has settled, it is filtered and washed with water and is crystallised with the minimum quantity of alcohol to 50%, 900–1000 ccs. Finally it is filtered and washed with a little alcohol at 95%. There remains 35 to 40 grs.

Other aminoacids such as phenylamine and arginine, which can be precipitated in part, are easily eliminated by crystallisation.

We claim:

1. A process of preparing histidine and leucine from the dried precipitation product from a solution of acid hydrolysis products of a protein, precipitated by dichlorobenzene sulphonic acid, which precipitation product contains histidine and leucine compounds, which comprises treating such dried precipitation product with acetone, to dissolve the leucine compound while leaving the histidine compound undissolved.

2. A process of obtaining histidine and leucine which comprises hydrolyzing a protein material with a mineral acid, evaporating the acid solution to dryness, redissolving the residue and filtering, adding 3,4-dichloro-benzene 1-sulphonic acid to effect precipitation of leucine and histidine compounds, separating the precipitate, drying same and treating same with acetone to dissolve the leucine compound, and leave the histidine compound undissolved.

3. A process as in claim 1, in which the dichloro benzene sulphonic acid is 3,4-dichloro-benzene 1-sulphonic acid.

LUIGI BUTTURINI.
GIUSEPPE BERNINI.

REFERENCES CITED

The following references are of record in the file of this patent:

Vickery, J. Biol. Chem., vol. 143, pp. 77–87 (1942).

Vickery, J. Biol. Chem., vol. 144, pp. 719–721 (1942).